United States Patent
Wang et al.

(10) Patent No.: US 7,886,552 B2
(45) Date of Patent: Feb. 15, 2011

(54) COMPRESSOR CYCLE CONTROL METHOD FOR A VEHICLE AIR CONDITIONING SYSTEM

(75) Inventors: Mingyu Wang, East Amherst, NY (US); Prasad S. Kadle, Williamsville, NY (US); Mark J. Zima, Clarence Center, NY (US)

(73) Assignee: Delphi Technologies, Inc., Troy, MI (US)

( * ) Notice: Subject to any disclaimer, the term of this patent is extended or adjusted under 35 U.S.C. 154(b) by 484 days.

(21) Appl. No.: 12/148,160

(22) Filed: Apr. 17, 2008

(65) Prior Publication Data

US 2009/0260374 A1 Oct. 22, 2009

(51) Int. Cl.
 B60H 1/32 (2006.01)
(52) U.S. Cl. .................. 62/228.1; 62/244; 165/202
(58) Field of Classification Search .................. 62/226, 62/227, 228.1, 228.4, 228.5, 229, 239–244; 165/202
 See application file for complete search history.

(56) References Cited

U.S. PATENT DOCUMENTS

| | | | |
|---|---|---|---|
| 4,540,040 A | * | 9/1985 | Fukumoto et al. ........... 165/202 |
| 4,856,293 A | * | 8/1989 | Takahashi ................... 62/228.3 |
| 4,878,358 A | * | 11/1989 | Fujii ............................ 62/227 |
| 6,293,116 B1 | * | 9/2001 | Forrest et al. ................. 62/227 |
| 6,367,278 B1 | * | 4/2002 | Strussion et al. .............. 62/314 |
| 7,409,984 B2 | * | 8/2008 | Samukawa ................... 165/202 |
| 7,562,698 B2 | * | 7/2009 | Fujiki et al. ................. 165/202 |

* cited by examiner

*Primary Examiner*—William E Tapolcai
(74) *Attorney, Agent, or Firm*—Patrick M. Griffin

(57) ABSTRACT

A control methodology for dynamically adjusting the switching limits of a cycled refrigerant compressor in an air conditioning system with the objective of achieving an optimal or specified tradeoff between compressor cycling frequency and discharge air temperature variation under all operating conditions. In a first embodiment, the compressor cycling limits are controlled to maintain a virtually constant discharge air temperature variation for all operating conditions. In a second embodiment, the compressor cycling limits are controlled so that the discharge air temperature variation changes in relation to the discharge air temperature to provide a virtually constant human comfort level for the occupants. And in a third embodiment, the compressor cycling limits are controlled so that the discharge air temperature variation changes in relation to the ambient or outside air temperature to provide a virtually constant human comfort level for the occupants.

10 Claims, 7 Drawing Sheets

COMPRESSOR CYCLE CONTROL METHOD FOR A VEHICLE AIR CONDITIONING SYSTEM

TECHNICAL FIELD

The present invention relates to a motor vehicle air conditioning system including a refrigerant compressor that is cycled on and off to control cooling capacity, and more particularly to a compressor cycling control method that dynamically optimizes occupant comfort and compressor reliability.

BACKGROUND OF THE INVENTION

The cooling capacity of an air conditioning system including a fixed displacement refrigerant compressor is typically regulated by cycling the compressor on and off. In the exemplary automotive air conditioning system 10 of FIG. 1, the compressor 12 is coupled to a driven pulley 14 by an electrically activated clutch 16 so that compressor 12 can be cycled on and off by respectively engaging and disengaging clutch 16. The refrigerant flows through a closed circuit including a condenser 18, an orifice tube 20, an evaporator 22, and an accumulator/dehydrator 24 arranged in order between the compressor discharge and suction ports 26 and 28. The cooling fans 30 are electrically activated to provide supplemental airflow for removing heat from high-pressure refrigerant in condenser 18, and the orifice tube 20 allows the cooled high-pressure refrigerant in line 30 to expand in isenthalpic fashion before passing through the evaporator 22. The evaporator 22 is formed as an array of finned refrigerant-conducting tubes, and an air intake duct 32 disposed upstream of evaporator 22 houses a motor driven ventilation blower 34 for forcing air past the evaporator tubes. The duct 32 is divided upstream of the blower 34, and an inlet air control door 36 is adjustable as shown to apportion the inlet air between outside air and cabin air. An air outlet duct 38 downstream of evaporator 22 houses a heater core 40 formed as an array of finned tubes through which flows engine coolant. The heater core 40 effectively bifurcates the outlet duct 38, and a re-heat air control door 42 next to heater core 40 is adjustable as shown to apportion the airflow through and around heater core 40. The heated and un-heated air portions are mixed in a plenum 44 downstream of heater core 40, and two discharge air control doors 46 and 48 are adjustable as shown to direct the mixed air through one or more outlets, including a defrost outlet 50, a heater outlet 52, and driver and passenger panel outlets 54 and 56. Activation of compressor clutch 16, cooling fans 30, blower 34, and air control doors 36, 42, 46 and 48 is controlled by a microprocessor-based controller 58.

Traditionally, the controller 58 is programmed to cycle the compressor on and off as required to prevent condensate from freezing on the evaporator 22, and a portion of the conditioned air is re-heated by heater core 40 so that the temperature of air discharged through the outlets 50-56 corresponds to a desired discharge air temperature. The compressor cycle control can be achieved with a pressure transducer responsive to the low side refrigerant pressure, or with a temperature transducer 60 responsive to the evaporator outlet air temperature ($T_{evp}$). In either case, the compressor clutch 16 is disengaged when the measured parameter falls below a calibrated lower threshold, and is later re-engaged when the measured parameter rises above a calibrated upper threshold. For example, the upper and lower thresholds may be calibrated so that $T_{evp}$ cycles between 3° C. and 4.5° C., establishing a hysteresis band of 1.5° C.

More recently, it has been proposed to improve the system efficiency by varying the compressor capacity control based on user cooling requirements. In this way, the compressor capacity can be reduced to satisfy the occupant cooling requirements with a somewhat elevated evaporator outlet air temperature (or refrigerant pressure), thereby reducing both over-dehumidification of the discharge air and series re-heating of the evaporator outlet air. See, for example, the U.S. Pat. No. 6,293,116 to Forrest et al., assigned to the assignee of the present invention, and incorporated by reference herein. The general principle is to cool the inlet air only as low as needed to meet the discharge air temperature requirement. For example, if the discharge air temperature target is 10° C., there is no need to cool the air down to 3° C., only to reheat it to 10° C. To provide at least a certain level of dehumidification for occupant comfort and prevention of windshield fogging, the evaporator temperature set point can be kept below a limit value such as 10° C. But in general, reducing over-dehumidification improves occupant comfort, and operating the compressor at a reduced capacity improves the energy efficiency of the air conditioning system. This control can be achieved with an electronically controlled variable displacement compressor, but it is generally more cost effective to use a fixed displacement compressor that is cycled on and off to control cooling capacity. Another possibility is to cycle a pneumatically controlled variable displacement compressor, as disclosed by Zima et al. in the U.S. patent application Ser. No. 11/805,469, filed May 22, 2007, assigned to the assignee of the present invention, and incorporated by reference herein.

In systems where the compressor capacity is controlled by cycling, the calibrator establishes a hysteresis band defined by upper and lower switching thresholds as mentioned above. In the case of the traditional freeze-point control, the set point (i.e., the lower threshold) is fixed at 3° C., for example, whereas in the case of the high-efficiency control, the set point varies between, say, 3° C. and 10° C. In either case, the difference between the upper and lower thresholds (i.e., the hysteresis band) is selected to strike a balance between the compressor clutch cycling frequency (which increases as the difference in thresholds is reduced) and discharge air temperature variation (which increases as the difference in thresholds is enlarged). In general, the calibrator seeks to limit the compressor clutch cycling frequency to address compressor and clutch durability considerations, while limiting the discharge air temperature variation to address occupant comfort considerations. This is graphically illustrated in FIGS. 2A-2B. FIG. 2A illustrates a freeze point control in which the compressor is cycled on and off using a fixed temperature set point 60 of 3° C. following an initial cool-down period. The set point of 3° C. serves as a lower threshold, and the upper threshold 62 is calibrated to 4.5° C. for a hysteresis band of 1.5° C. FIG. 2B illustrates a high efficiency control in which the compressor is cycled on and off about a variable temperature set point 64 following the initial cool-down period. In the illustration, the set point 64 has an initial value of 3° C., and then transitions to an elevated value of about 8.0° C. Similar to FIG. 2A, the set point 64 serves as a lower threshold, and an upper threshold 66 tracks the set point 64 to define a hysteresis band of 1.5° C. Thus, the width or size of the hysteresis band can be the same for both control strategies.

A problem faced in the calibration of compressor switching limits (i.e., the hysteresis band) is that the settings which provide an adequate tradeoff between compressor cycling frequency and discharge air temperature variation under one set of operating conditions can fail to provide an adequate tradeoff under a different set of operating conditions. Accordingly, what is needed is a way of achieving an optimal or specified tradeoff between compressor cycling frequency and discharge air temperature variation under any set of operating conditions.

SUMMARY OF THE INVENTION

The present invention is directed to an improved control methodology for dynamically adjusting the switching limits of a cycled refrigerant compressor in an air conditioning system with the objective of achieving an optimal or specified tradeoff between compressor cycling frequency and discharge air temperature variation under all operating conditions. In a first embodiment, the compressor cycling limits are controlled to maintain a virtually constant discharge air temperature variation for all operating conditions. In a second embodiment, the compressor cycling limits are controlled so that the discharge temperature variation changes in relation to the discharge air temperature to provide a virtually constant human comfort level for the occupants. And in a third embodiment, the compressor cycling limits are controlled so that the discharge air temperature variation changes in relation to the ambient or outside air temperature to provide a virtually constant human comfort level for the occupants.

DESCRIPTION OF THE PREFERRED EMBODIMENT

Figure 1:
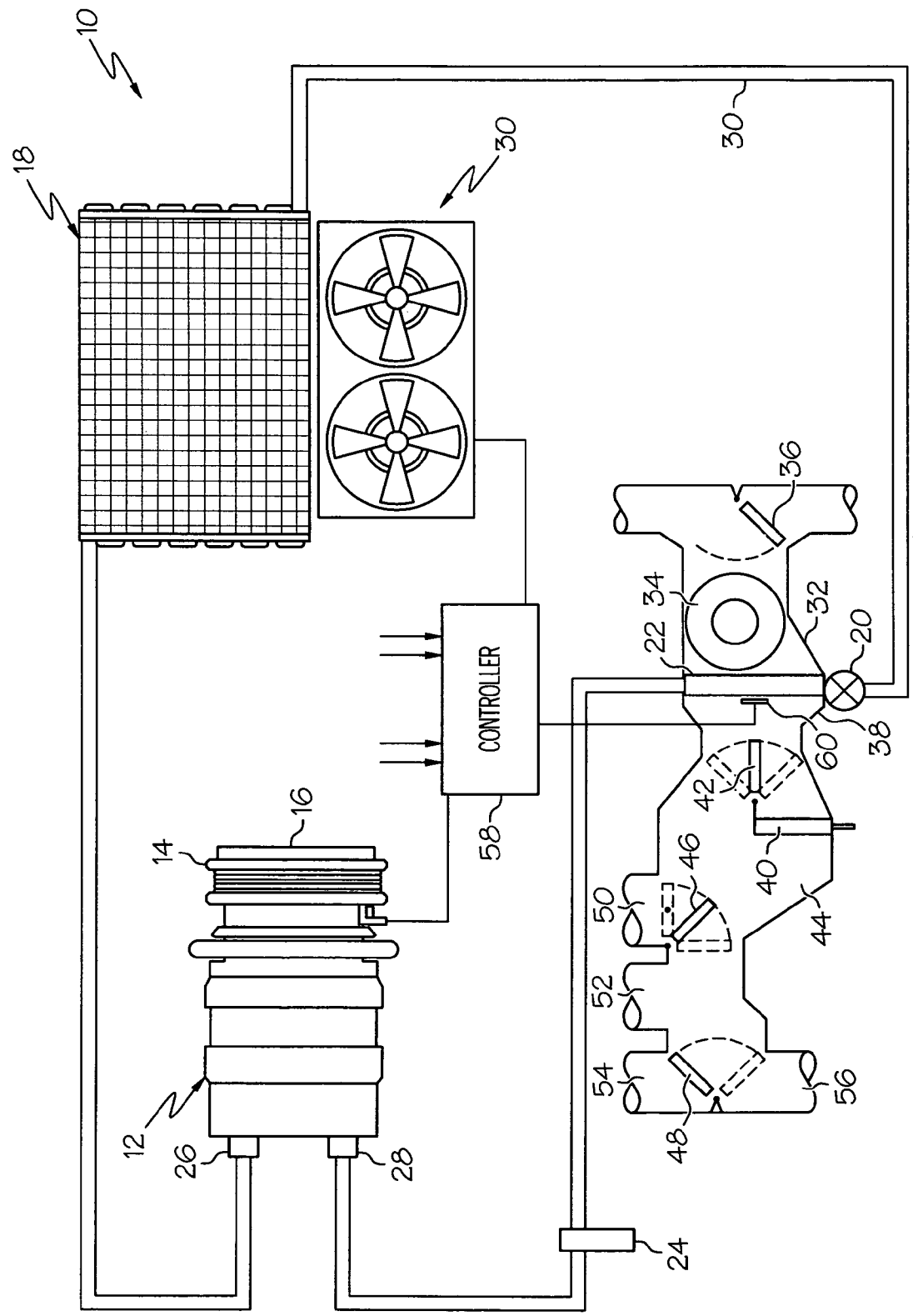
FIG. 1 is a diagram of an exemplary automotive air conditioning system, including a cycled refrigerant compressor and a microprocessor-based controller.
Figure 2A:
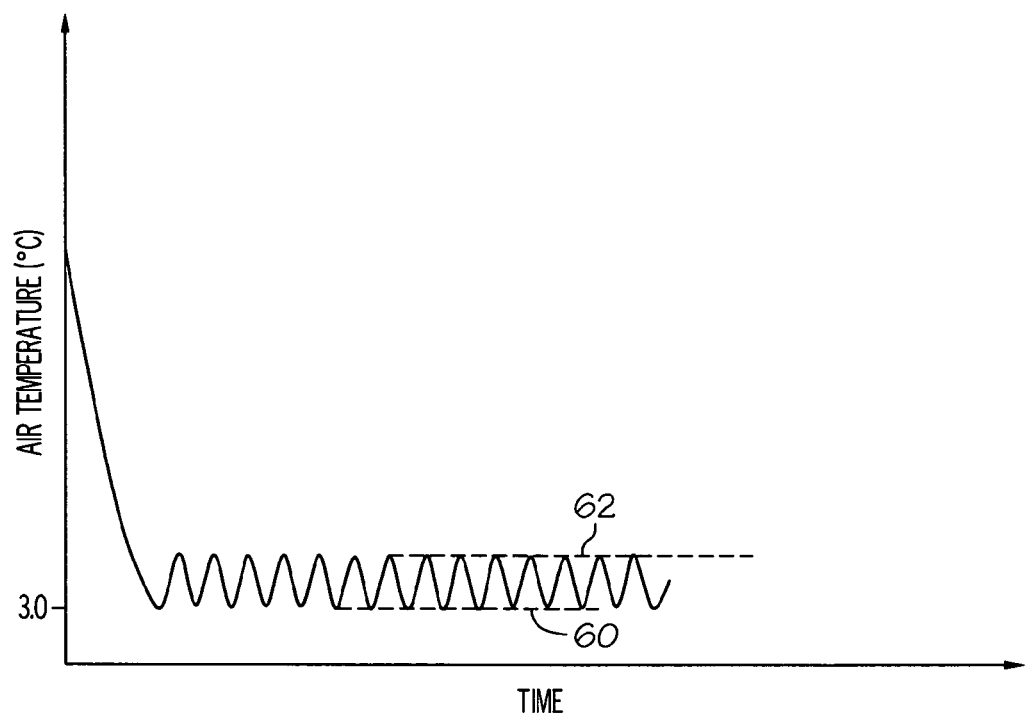
FIG. 2A is a graph illustrating a traditional compressor cycle control for preventing evaporator condensate freezing.
Figure 2B:
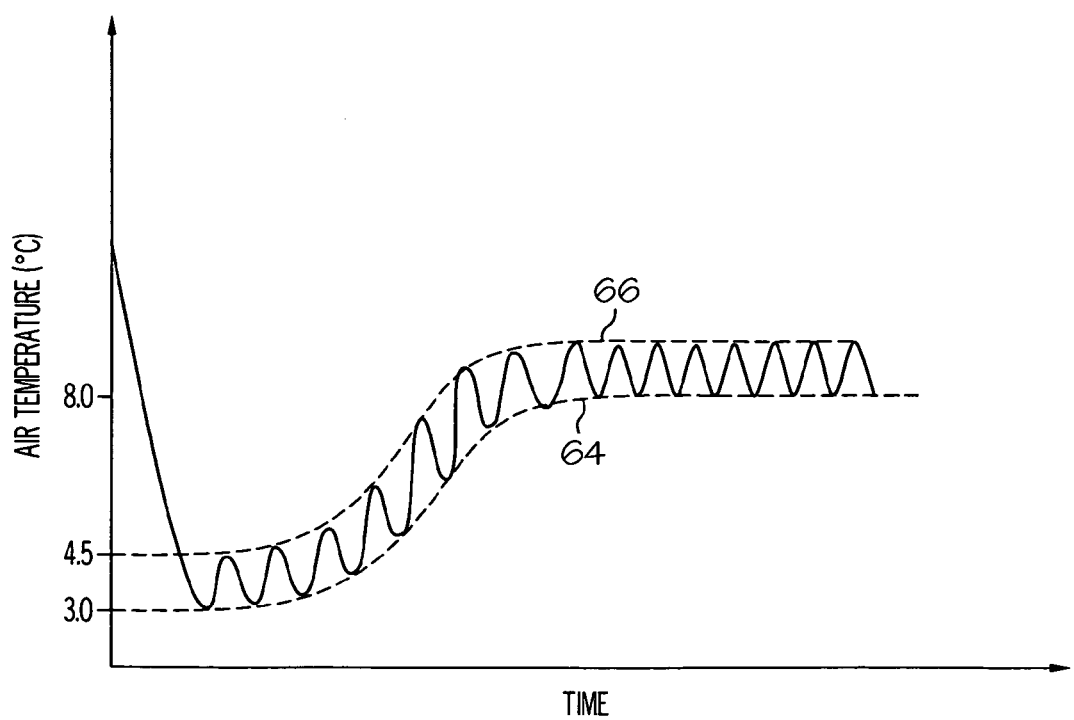
FIG. 2B is a graph illustrating a high efficiency compressor cycle control for allowing air conditioning operation at an elevated evaporator temperature.
Figure 3A:
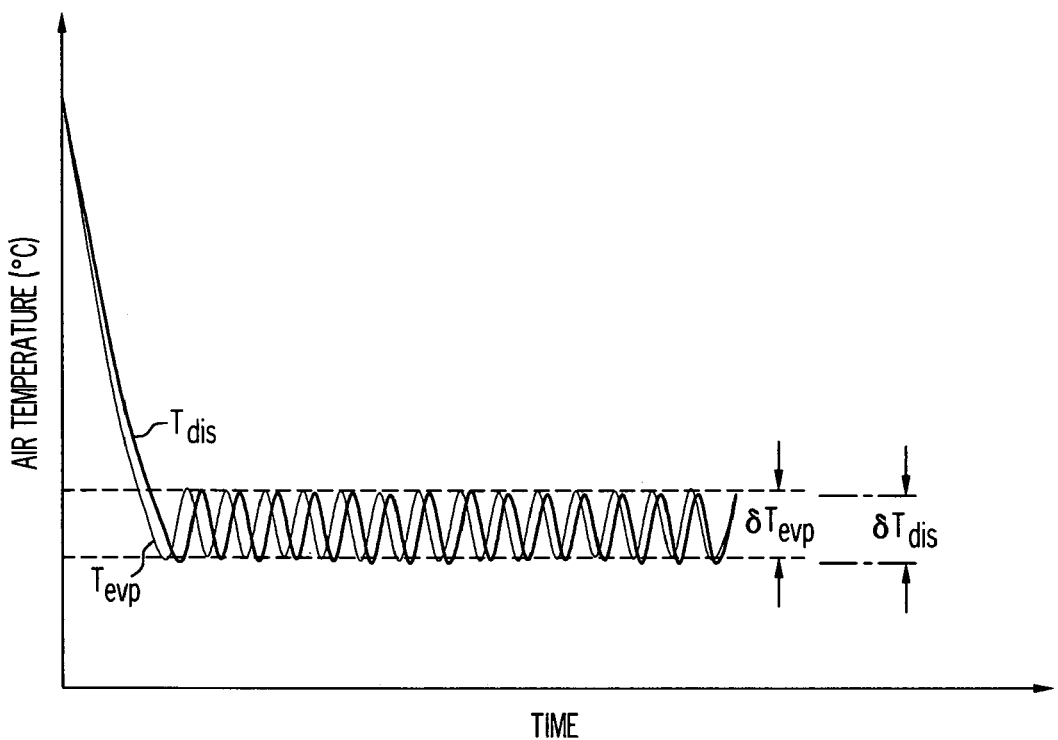
FIG. 3A is graph depicting evaporator outlet and discharge air temperatures as a function of time with minimum re-heating of the conditioned air.
Figure 3B:
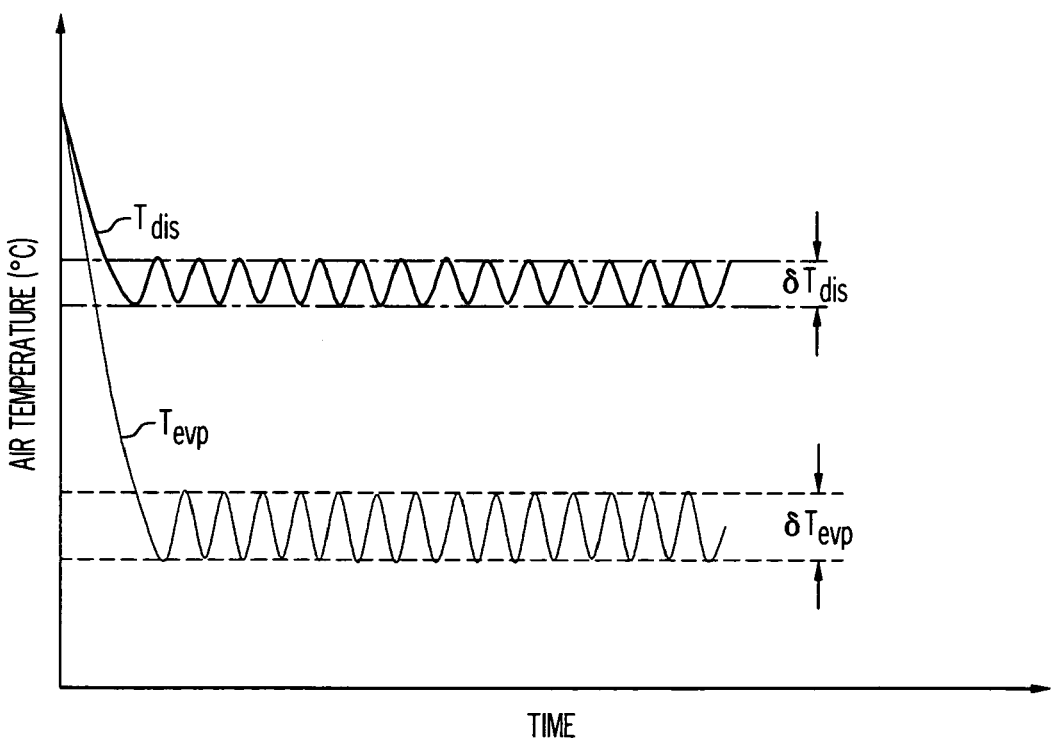
FIG. 3B is graph depicting evaporator outlet and discharge air temperatures as a function of time with maximum re-heating of the conditioned air.

In general, the present invention recognizes that re-heating conditioned air not only increases the discharge air temperature, but also tends to reduce the temperature variation of the discharge air as compared with the air at the outlet of the evaporator. This is because the heater core 40 tends to dilute or dampen temperature variations in the air passing through it. Consequently, the influence of the heater core 40 on discharge air temperature variation changes depending on what portion of the conditioned air is directed through the heater core 40. This phenomenon is graphically illustrated in FIGS. 3A-3B, which depict the evaporator outlet air temperature $T_{evp}$ and the discharge air temperature $T_{dis}$ as a function of time for different operating conditions of the air conditioning system 10. FIG. 3A depicts the temperatures $T_{evp}$ and $T_{dis}$ when the system 10 is operating with minimal re-heating of the conditioned air. As shown, the temperature variation $\delta T_{evp}$ of air at the outlet of evaporator 22 is virtually identical to the temperature variation $\delta T_{dis}$ of air discharged into the passenger compartment. FIG. 3B depicts the temperatures $T_{evp}$ and $T_{dis}$ when the system 10 is operating with maximum re-heating of the conditioned air. In this case, the elevated discharge air temperature $T_{dis}$ exhibits a variation $\delta T_{dis}$ that is significantly reduced compared with the evaporator outlet air temperature variation $\delta T_{evp}$ due to the reduced temperature variation of the air passing through heater core 40.

Figure 4:
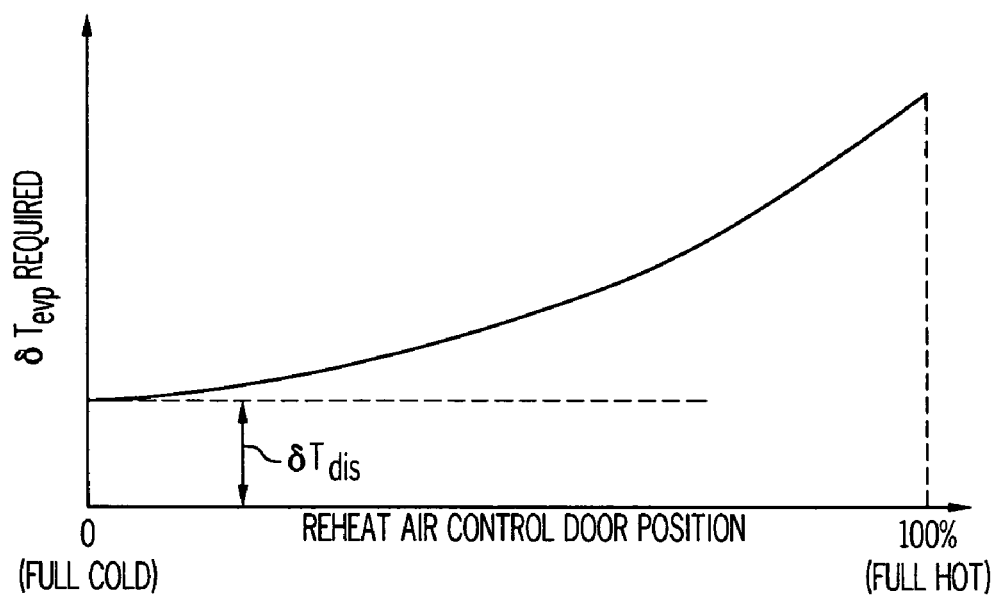
FIG. 4 is a graph depicting a required variation of the evaporator outlet air temperature for achieving a constant discharge air temperature variation according to a first embodiment of this invention.

The influence of re-heating on the discharge air temperature variation $\delta T_{dis}$ makes it difficult if not impossible to calibrate the compressor cycling limits (i.e., the switching hysteresis band) in a way that keeps $\delta T_{dis}$ within an acceptable range while also minimizing the compressor cycling frequency for optimal compressor and clutch durability. However, the present invention provides a way of achieving that objective through a dynamic control of the compressor cycling limits. According to a first embodiment, described below in reference to FIG. 4, the compressor cycling limits are controlled to maintain a virtually constant discharge air temperature variation for all operating conditions. According to a second embodiment, described below in reference to FIGS. 5A-5B, the compressor cycling limits are controlled so that the discharge air temperature variation changes in relation to the discharge air temperature to provide a virtually constant human comfort level for the occupants. And according to a third embodiment, described below in reference to FIGS. 6A-6B, the compressor cycling limits are controlled so that the discharge air temperature variation changes in relation to the ambient or outside air temperature to provide a virtually constant human comfort level for the occupants. Finally, FIG. 7 depicts a flow diagram for carrying out the various control methods. As described below in reference to FIG. 7, each of the above-mentioned embodiments entails determining the allowed variation in $T_{dis}$ and the required variation of the evaporator cooling capacity for achieving the allowed variation in $T_{dis}$. In general, the required variation of the evaporator cooling capacity is based on the position of the re-heat air control door 42, and the cycling thresholds for the compressor 12 are determined based on the required variation in evaporator cooling capacity and the desired set point for the cooling capacity of evaporator 22. In the following description, the evaporator cooling capacity, the cooling capacity set point and the compressor cycling thresholds are all expressed in terms of evaporator outlet temperature; however, it should be recognized that such parameters could alternatively be expressed in terms of low side refrigerant pressure.

The discharge air temperature $T_{dis}$ can be mathematically modeled as a function of various known or knowable parameters including the temperature $T_{clt}$ of the engine coolant supplied to heater core 40, the heating effectiveness $\epsilon$ of the heater core 40, the evaporator outlet air temperature $T_{evp}$, and the position $\omega$ of the re-heat air control door 42 as follows:

$$T_{dis}=[1-f(\omega)\epsilon]T_{evp}+f(\omega)\epsilon T_{clt} \qquad (1)$$

where $f(\omega)$ designates the fractional flow of inlet air passing through heater core 40. The heating effectiveness $\epsilon$, in turn, may be calculated according to:

$$\varepsilon = \frac{T_{htr} - T_{evp}}{T_{clt} - T_{evp}} \qquad (2)$$

where $T_{htr}$ is air temperature at the outlet of heater core 40. Differentiating equation (1) to provide an expression for the variation or rate of temperature change $\delta T_{dis}$ of the air discharged into the passenger compartment, yields:

$$\delta T_{dis}=[1-f(\omega)\epsilon]\delta T_{evp} \qquad (3)$$

When HVAC system 10 is operating with minimal re-heating of the conditioned air (i.e., with the re-heat air control door 42 in the "full cold" position), the fractional flow $f(\omega)$ through heater core 40 is substantially zero, and $\delta T_{dis}=\delta T_{evp}$ as also illustrated in FIG. 3A. On the other hand, when air conditioning system 10 is operating with maximum re-heating of the conditioned air (i.e., with the re-heat air control door 42 in the "full hot" position), the fractional flow $f(\omega)$ through heater core 40 is substantially one (100%), and $\delta T_{dis}$ is given by:

$$\delta T_{dis}=[1-\epsilon]\delta T_{evp} \qquad (4)$$

The first embodiment of this invention utilizes the above relationships to dynamically control the compressor cycling limits so that the discharge air temperature variation $\delta T_{dis}$ is substantially constant for all operating conditions of air conditioning system 10. This is achieved by solving equation (3) for $\delta T_{evp}$ as follows:

$$\delta T_{evp} = \frac{\delta T_{dis}}{[1-f(\omega)\varepsilon]} \qquad (5)$$

In this case, the desired discharge air temperature variation $\delta T_{dis}$ is specified as a constant that is consistent with occupant comfort, and the required evaporator outlet air temperature variation $\delta T_{evp}$ is given as a function of the heating effectiveness $\epsilon$, and the heater fractional flow $f(\omega)$. The calculated term $\delta T_{evp}$ represents the switching hysteresis band required to achieve the specified discharge air temperature variation $\delta T_{dis}$, and the upper and lower compressor cycling limits are determined accordingly. Since the heating effectiveness $\epsilon$ is substantially constant for steady-state operation, the required value of $\delta T_{evp}$ can be pre-calculated as a function of re-heat air control door position $\omega$, resulting in the control schedule depicted in FIG. 4. The required $\delta T_{evp}$ is equal to $\delta T_{dis}$ when the re-heat air control door 42 is in the "full cold" or 0% position as mentioned above, and increases non-linearly to a maximum value when re-heat air control door 42 is in the "full hot" or 100% position. Whenever $T_{evp}$ is above $\delta T_{dis}$ due to re-heating of conditioned air, the compressor switching hysteresis correspondingly increases to provide improved compressor and clutch durability.

Figure 5A:
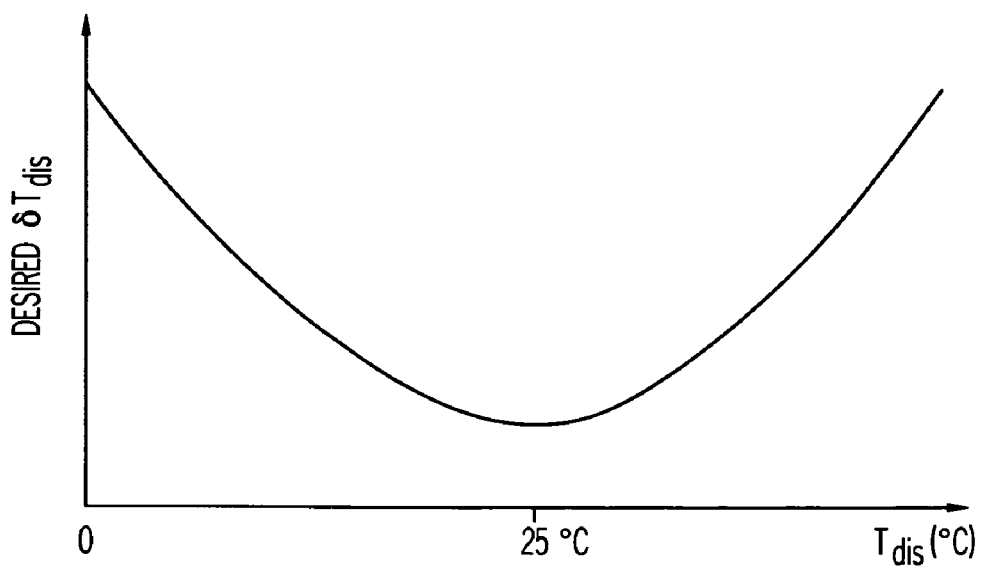
FIG. 5A is a graph depicting a desired variation of the discharge air temperature according to second embodiment of this invention.

The second embodiment of this invention is like the first except that the compressor cycling limits are dynamically controlled to vary the discharge air temperature variation $\delta T_{dis}$ as a function of the discharge air temperature $T_{dis}$ as illustrated in FIG. 5A. The illustrated air discharge temperature variation schedule is based on human thermal comfort sensitivity studies which show that vehicle occupants are extremely sensitive to discharge air temperature variations when $T_{dis}$ is about 20° C. to 25° C., but less sensitive when $T_{dis}$ is significantly higher or lower than 20° C. to 25° C.—for convenience, a single temperature of 25° C. is used in this description. As a result, controlling $\delta T_{dis}$ as illustrated in FIG. 5A can maintain a substantially constant level of human comfort under any operating condition of air conditioning system 10.

Figure 5B:
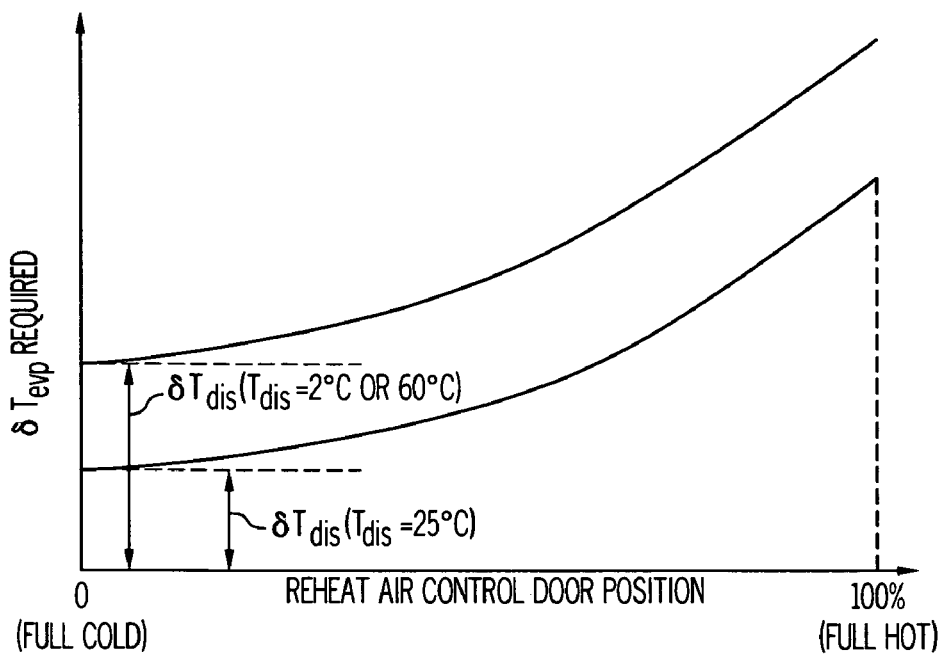
FIG. 5B is a graph depicting a required variation of the evaporator outlet air temperature for achieving the desired discharge air temperature variation depicted in FIG. 5A.

In a control according to the second embodiment, the required value of $\delta T_{evp}$ is again determined according to equation (5), except that the parameter $\delta T_{dis}$ is now a function of $T_{dis}$ instead of a constant value. And the required value of $\delta T_{evp}$ can be pre-calculated as a function of $T_{dis}$ and re-heat air control door position $\omega$. In this regard, the graph of FIG. 5B depicts the required value of $\delta T_{evp}$ as a function of door position $\omega$ for three different discharge air temperatures. The lower trace depicts the required $\delta T_{evp}$ for $T_{dis}=25°$ C., the condition for which the discharge air temperature variation $\delta T_{dis}$ is minimized. The upper trace depicts the required $\delta T_{evp}$ at the $T_{dis}$ extremes of 2° C. or 60° C. Of course, the required $\delta T_{evp}$ for discharge air temperatures between 25° C. and the extreme temperatures of 2° C. and 60° C. are given by traces lying between the illustrated upper and lower traces. Significantly, this embodiment allows greater compressor switching hysteresis for improved compressor and clutch durability over an extended range of operating conditions—specifically, whenever the desired discharge air temperature is significantly higher or lower than 25° C.

Figure 6A:
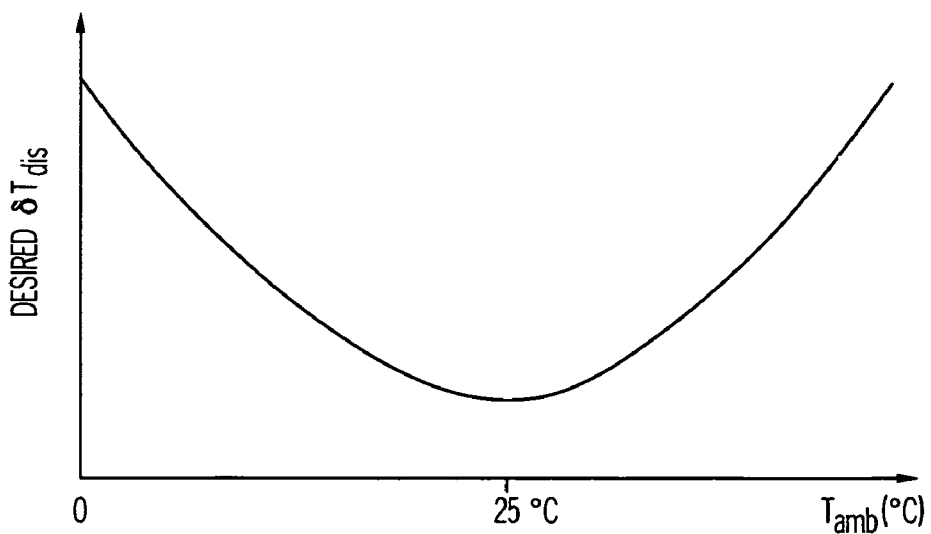
FIG. 6A is a graph depicting a desired variation of the discharge air temperature according to third embodiment of this invention.
Figure 7:
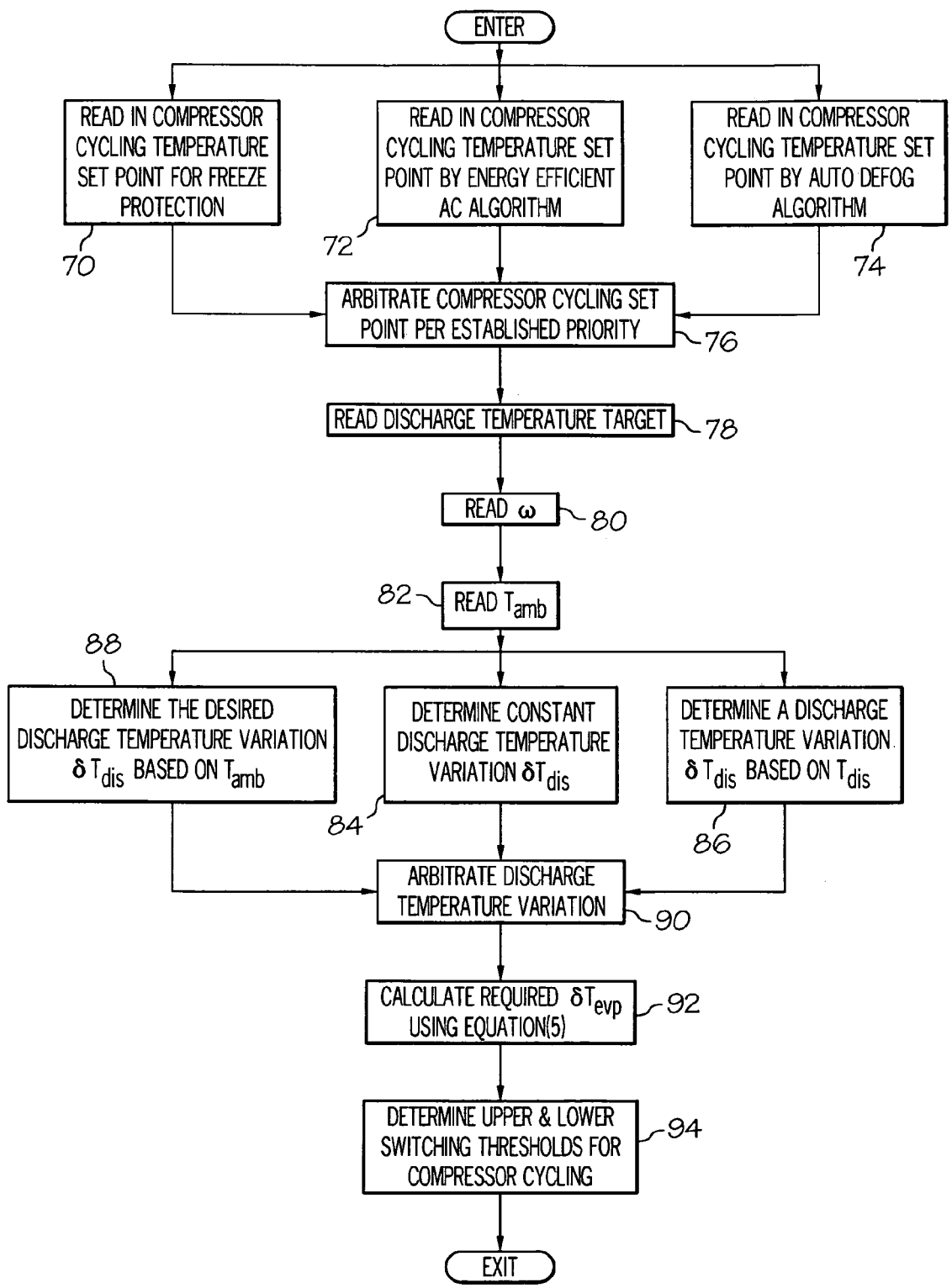
FIG. 7 is a flow diagram of a software routine carried out by the controller of FIG. 1 for cycling the compressor to achieve a desired discharge air temperature variation according to this invention.

In the third embodiment of this invention, the desired discharge air temperature variation $\delta T_{dis}$ is varied as a function of the ambient or outside air temperature $T_{amb}$ as illustrated in FIG. 6A. This yields a substantially constant level of human comfort similar to the second embodiment because in most cases the discharge air temperature $T_{dis}$ inversely tracks the ambient temperature $T_{amb}$. That is, high ambient temperatures call for lower discharge air temperatures, and low ambient temperatures call for higher discharge air temperatures to maintain a comfortable passenger compartment. In other words, this embodiment recognizes that optimal human comfort can be achieved by scheduling $\delta T_{dis}$ as a function of $T_{amb}$ instead of $T_{dis}$ if desired.

Figure 6B:
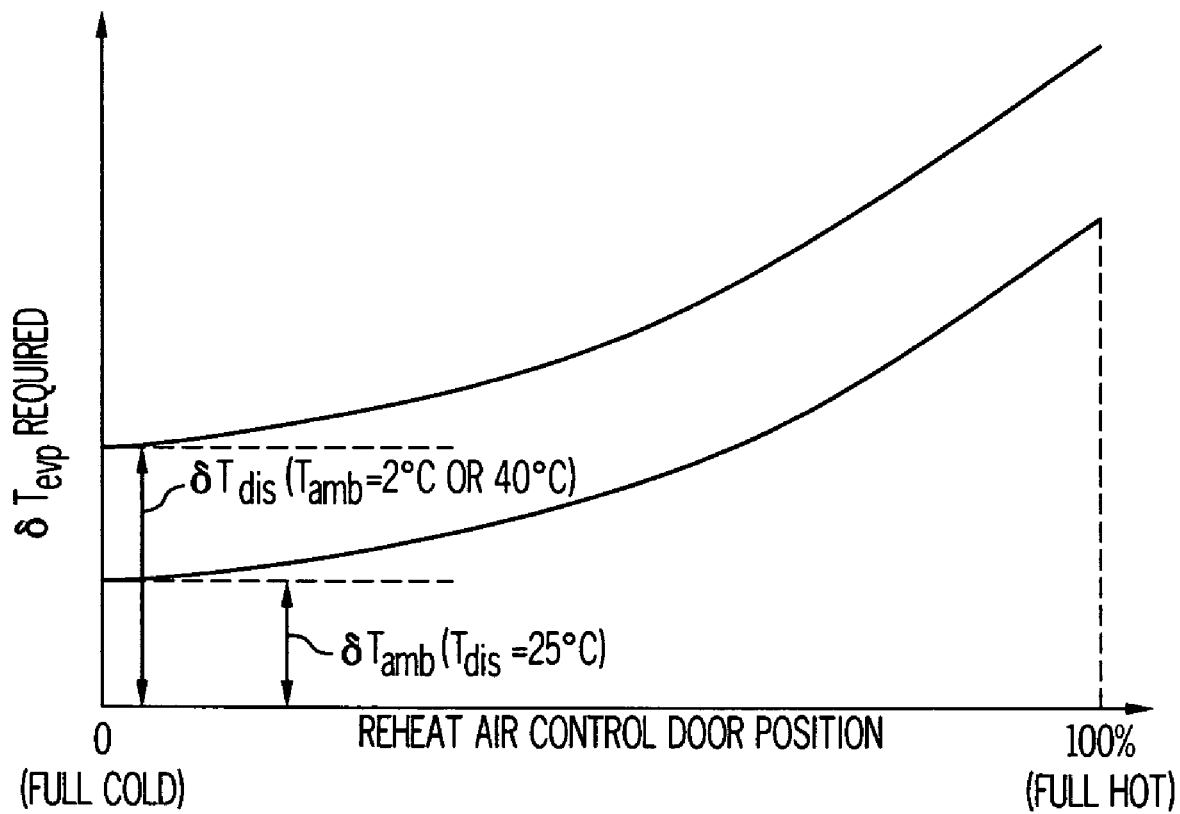
FIG. 6B is a graph depicting a required variation of the evaporator outlet air temperature for achieving the desired discharge air temperature variation depicted in FIG. 6A.

In a control according to the third embodiment, the required value of $\delta T_{evp}$ is again determined according to equation (5), except that $\delta T_{dis}$ varies as a function of $T_{amb}$ as shown in FIG. 6A. If desired, the required value of $\delta T_{evp}$ can be pre-calculated as a function of $T_{amb}$ and re-heat air control door position ω. In this regard, the graph of FIG. 6B depicts the required value of $\delta T_{evp}$ as a function of door position ω for three different ambient air temperatures. The lower trace depicts the required $\delta T_{evp}$ for $T_{amb}$=25° C., the condition for which the discharge air temperature variation $\delta T_{dis}$ is minimized. The upper trace depicts the required $\delta T_{evp}$ at the $T_{amb}$ extremes of 2° C. or 40° C. Of course, the required $\delta T_{evp}$ for ambient air temperatures between 25° C. and the extreme temperatures of 2° C. and 40° C. are given by traces lying between the illustrated upper and lower traces. As with the second embodiment, this embodiment allows greater compressor switching hysteresis for improved compressor and clutch durability over an extended range of operating conditions—specifically, whenever the ambient air temperature $T_{amb}$ is significantly higher or lower than 25° C.

The flow diagram of FIG. 7 represents a software routine executed by controller 58 of air conditioning system 10 for carrying out the above-described control methods. The routine is periodically executed by controller 58 so that the compressor cycling limits are dynamically adjusted as the operating conditions of air conditioning system 10 change over time. The illustrated routine is configured to perform any of the first, second or third control strategies described above, but it will be appreciated that the routine can be simplified to perform just one of the control strategies if desired.

Referring to FIG. 7, the blocks 70-76 are first executed to determine a suitable set point for the evaporator outlet air temperature $T_{evp}$. As discussed above, the set point for $T_{evp}$ may be calibrated or determined based on different and sometimes conflicting considerations, including evaporator freeze protection (block 70), system energy efficiency (block 72), and windshield fog prevention (block 74). The block 76 selects the most appropriate set point based on an established priority. For example, if the set point for preventing windshield fogging is lower than the set point for optimal energy efficiency, controller 58 can be programmed to select the set point for preventing windshield fogging.

Once the set point for $T_{evp}$ is established, blocks 78, 80 and 82 are executed to obtain a target value of the discharge air temperature $T_{dis}$, the re-heat air control door position ω, and the ambient temperature $T_{amb}$. If the system 10 is an automatic climate control system where the driver establishes a set temperature for the cabin and the controller 58 regulates the blower speed and air control door positions to satisfy the driver's set temperature, the target value of $T_{dis}$, ω, and $T_{amb}$ may be obtained from automatic climate control algorithm. If the system 10 is a so-called manual system, the target value of $T_{dis}$ is the setting of a temperature control knob or slider, and ω and $T_{amb}$ can be obtained with suitable position and temperature transducers.

Blocks 84-90 are then executed to determine a desired value of the discharge air temperature variation $\delta T_{dis}$ using the first, second or third embodiments described above. Block 84 sets the desired value of $\delta T_{dis}$ to a predetermined constant as explained above in reference to the first embodiment; block 86 determines the desired value of $\delta T_{dis}$ based on the target discharge air temperature $T_{dis}$ as explained above in reference to the second embodiment; and block 88 determines the desired value of $\delta T_{dis}$ based on the ambient air temperature $T_{amb}$ as explained above in reference to the third embodiment. In blocks 86 and 88, the desired value of $\delta T_{dis}$ may be determined either by table look-up or analytical function. Block 90 selects one of the $\delta T_{dis}$ values based on a calibration bit, or an established priority if desired.

Once the desired value of $\delta T_{dis}$ is determined, block 92 determines the required value of $\delta T_{evp}$ based on the desired value of $\delta T_{dis}$ and the re-heat air control door position ω. As indicated above, $\delta T_{evp}$ can be determined by solving equation (5) directly, or by table look-up. The value of the heating effectiveness ε can be predicted, or calculated if sufficient information is available. Finally, block 94 is executed to determine the upper and lower temperature thresholds for compressor cycling based on the set point provided by block 76 and the $\delta T_{evp}$ value provided by block 92. As described above, the lower threshold can be the set point, and the upper threshold can be the sum of the set point and $\delta T_{evp}$. As with a conventional control, the controller 58 compares the measured evaporator outlet air temperature to the upper and lower temperature thresholds to control compressor cycling.

In summary, the present invention provides a novel methodology for dynamically controlling compressor clutch cycling based on air conditioning system operating parameters to achieve an optimal or specified tradeoff between compressor cycling frequency and discharge air temperature variation under any set of operating conditions. While the present invention has been described with respect to the illustrated embodiments, it is recognized that numerous modifications and variations in addition to those mentioned herein will occur to those skilled in the art. For example, the control may be based on low side refrigerant pressure instead of evaporator outlet air temperature as mentioned above, and the specific temperatures and curve shapes shown herein are exemplary in nature, and may vary somewhat depending on the application. Accordingly, it is intended that the invention not be limited to the disclosed embodiment, but that it have the full scope permitted by the language of the following claims.

The invention claimed is:

1. A method of operation for an air conditioning system including an evaporator for conditioning inlet air, a refrigerant compressor that is cycled on and off to control a cooling capacity of the evaporator, and a heater core configured to re-heat a selected portion of the conditioned inlet air to affect a discharge air temperature of the system, the method comprising the steps of:
   determining a desired set point for the cooling capacity of the evaporator;
   determining what portion of the conditioned air is re-heated by the heater core;
   determining an allowed variation in the discharge air temperature;
   determining a required variation of the evaporator cooling capacity for achieving the allowed variation in the discharge air temperature based on allowed variation in the discharge air temperature and the determined portion of conditioned air that is re-heated by the heater core; and
   cycling the compressor on and off according to the desired set point and the required variation in evaporator cooling capacity.

2. The method of claim 1, including the steps of:
   determining upper and lower switching thresholds for the evaporator cooling capacity based on the desired set point and the required variation in evaporator cooling capacity; and cycling the compressor on and off by comparing a measure of the evaporator cooling capacity with the upper and lower switching thresholds.

3. The method of claim 1, where:
the desired set point for the evaporator cooling capacity is a desired outlet air temperature of the evaporator; and
the required variation of the evaporator cooling capacity is a required variation in the outlet air temperature of the evaporator.

4. The method of claim 1, where:
the allowed variation in the discharge air temperature is a specified constant value.

5. The method of claim 1, including the step of:
determining the allowed variation in the discharge air temperature as a function of the discharge air temperature.

6. The method of claim 5, where:
the allowed variation in the discharge air temperature has a minimum value at a discharge air temperature of approximately 20° C. to 25° C.

7. The method of claim 1, including the steps of:
determining an ambient air temperature; and
determining the allowed variation in the discharge air temperature as a function of the determined ambient air temperature.

8. The method of claim 7, where:
the allowed variation in the discharge air temperature has a minimum value at an ambient air temperature of about 20° C. to 25° C.

9. The method of claim 1, including the step of:
determining the required variation of the evaporator cooling capacity for achieving the allowed variation in the discharge air temperature in accordance with:

$$\frac{\delta T_{dis}}{[1 - f(\omega)\varepsilon]}$$

where $\delta T_{dis}$ is the allowed variation in the discharge air temperature, $f(\omega)$ is the determined portion of conditioned air that is re-heated by the heater core, and $\varepsilon$ is a heating effectiveness of the heater core.

10. The method of claim 1, where the air conditioning system includes an air control door for controlling what portion of conditioned air is re-heated by the heater core, and the method includes the steps of:
determining a position of said air control door; and
determining what portion of the conditioned air is re-heated by the heater core based on the determined position of said air control door.

* * * * *